(12) United States Patent
Moyer et al.

(10) Patent No.: US 9,116,845 B2
(45) Date of Patent: Aug. 25, 2015

(54) REMOTE PERMISSIONS PROVISIONING FOR STORAGE IN A CACHE AND DEVICE THEREFOR

(75) Inventors: William C. Moyer, Dripping Springs, TX (US); Joseph C. Circello, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 400 days.

(21) Appl. No.: 13/033,327

(22) Filed: Feb. 23, 2011

(65) Prior Publication Data

US 2012/0216002 A1 Aug. 23, 2012

(51) Int. Cl.
*G06F 12/14* (2006.01)
*G06F 21/62* (2013.01)

(52) U.S. Cl.
CPC ............ *G06F 12/1416* (2013.01); *G06F 21/62* (2013.01)

(58) Field of Classification Search
None
See application file for complete search history.

(56) References Cited

U.S. PATENT DOCUMENTS

| | | | |
|---|---|---|---|
| 4,325,120 A | 4/1982 | Colley et al. | |
| 4,672,538 A | 6/1987 | Takane | |
| 4,774,653 A | 9/1988 | James | |
| 4,949,238 A | 8/1990 | Kamiya | |
| 5,577,230 A | 11/1996 | Argade et al. | |
| 5,649,159 A | 7/1997 | Le et al. | |
| 5,666,509 A | 9/1997 | McCarthy et al. | |
| 5,889,952 A | 3/1999 | Hunnicutt et al. | |
| 6,101,590 A | 8/2000 | Hansen | |
| 6,412,043 B1 | 6/2002 | Chopra et al. | |
| 6,449,699 B2 | 9/2002 | Franke et al. | |
| 6,449,700 B2 | 9/2002 | Hagersten et al. | |
| 6,591,340 B2 | 7/2003 | Chopra et al. | |
| 6,718,426 B2 | 4/2004 | Naya et al. | |
| 6,810,471 B2 | 10/2004 | Fujii | |
| 6,836,836 B2 | 12/2004 | Shinozaki | |
| 6,898,697 B1 | 5/2005 | Gao et al. | |
| 7,353,535 B2 * | 4/2008 | Kaler et al. ....................... 726/5 |
| 7,805,588 B2 | 9/2010 | Bridges et al. | |
| 2002/0065996 A1 | 5/2002 | Garnett et al. | |
| 2002/0078239 A1 | 6/2002 | Howard et al. | |
| 2002/0199076 A1 | 12/2002 | Fujii | |
| 2003/0135709 A1 | 7/2003 | Niles et al. | |
| 2003/0191846 A1 | 10/2003 | Hunnicutt et al. | |
| 2004/0049600 A1 | 3/2004 | Boyd et al. | |
| 2005/0060606 A1 | 3/2005 | Kalan et al. | |

(Continued)

FOREIGN PATENT DOCUMENTS

WO WO9849623 A1 2/1998

OTHER PUBLICATIONS

U.S. Appl. No. 13/249,829, filed Sep. 30, 2011, having inventors William C. Moyer et al.

(Continued)

*Primary Examiner* — Christian P Chace
*Assistant Examiner* — Eric Loonan

(57) ABSTRACT

A system and method are disclosed for determining whether to allow or deny an access request based upon one or more descriptors at a local memory protection unit and based upon one or more descriptors a system memory protection unit. When multiple descriptors of a memory protection unit apply to a particular request, the least-restrictive descriptor will be selected. System access information is stored at a cache of a local core in response to a cache line being filled. The cached system access information is merged with local access information, wherein the most-restrictive access is selected.

18 Claims, 10 Drawing Sheets

(56) References Cited

U.S. PATENT DOCUMENTS

| | | | |
|---|---|---|---|
| 2006/0149911 A1 | 7/2006 | Kimelman et al. | |
| 2007/0011419 A1* | 1/2007 | Conti | 711/163 |
| 2007/0079093 A1 | 4/2007 | Axford et al. | |
| 2007/0277009 A1 | 11/2007 | Anschel et al. | |
| 2008/0163353 A1* | 7/2008 | Conti | 726/11 |
| 2008/0250228 A1 | 10/2008 | Elliott et al. | |
| 2008/0306954 A1 | 12/2008 | Hornqvist | |
| 2009/0007219 A1* | 1/2009 | Abzarian et al. | 726/1 |
| 2009/0138963 A1 | 5/2009 | Sato et al. | |
| 2009/0204777 A1 | 8/2009 | Norman | |
| 2010/0107243 A1 | 4/2010 | Moyer et al. | |

OTHER PUBLICATIONS

Non-Final Office Action mailed Apr. 5, 2013 for U.S. Appl. No. 13/182,734, 17 pages.

Non-Final Office Action mailed Dec. 20, 2012, for U.S. Appl. No. 13/033,317, 17 pages.

U.S. Appl. No. 13/033,317, filed Feb. 23, 2011, having inventors William C. Moyer et al.

U.S. Appl. No. 13/182,734, filed Jul. 14, 2011, having inventors William C. Moyer et al.

MCF5301x Reference Manual, Aug. 2009, Freescale Semiconductor, Inc., Rev. 4, Document No. MCF53017RM; Chapter 13 "Memory Protection Unit (MPU)," 40 pages.

Power PC e500 Core Family Reference Manual, Apr. 2005, Freescale Semiconductor, Inc., Rev. 1, Chapter 2.12, 15 pages.

Power PC Microprocessor Family: The Bus Interface for 32-Bit Microprocessors, Jan. 2004, Freescale Semiconductor, Inc., Rev. 1, Chapter 2.5.4, 12 pages.

Final Office Action mailed Jun. 18, 2013 for U.S. Appl. No. 13/033,317, 13 pages.

Non-Final Office Action mailed Sep. 12, 2013 for U.S. Appl. No. 13/249,829, 52 pages.

Notice of Allowance mailed Jul. 16, 2013 for U.S. Appl. No. 13/182,734, 12 pages.

Non-Final Office Action mailed Feb. 13, 2014 for U.S. Appl. No. 13/033,317, 21 pages.

Final Office Action mailed Mar. 20, 2014 for U.S. Appl. No. 13/249,829, 58 pages.

Notice of Allowance mailed Oct. 7, 2014 for U.S. Appl. No. 13/249,829, 20 pages.

Final Office Action mailed Sep. 9, 2014 in U.S. Appl. No. 13/033,317, 21 pages.

* cited by examiner

| FIELD | | COMMENTS |
|---|---|---|
| V | | VALID BIT FOR ENTRY |
| UPPER_BOUND | | UPPER ADDRESS BOUND (COMPARED AGAINST EFFECTIVE ADDRESS) |
| LOWER_BOUND | | LOWER ADDRESS BOUND (COMPARED AGAINST EFFECTIVE ADDRESS) |
| TID[0:7] | | REGION ID (COMPARED AGAINST PID VALUE OR '0') |
| TIDMSK[0:7] | | REGION ID MASK |
| INST | | INSTRUCTION OR DATA ACCESS ENTRY (1=INST) |
| SX | SW | SR | SUPERVISOR EXECUTE, WRITE, AND READ PERMISSION BITS |
| UX | UW | UR | USER EXECUTE, WRITE, AND READ PERMISSION BITS |
| I | | CACHE-INHIBITED REGION ATTRIBUTE |
| G | | GUARDED REGION ATTRIBUTE (NOT PRESENT IN DEDICATED INST ENTRIES) |

REMOTE PERMISSIONS PROVISIONING FOR STORAGE IN A CACHE AND DEVICE THEREFOR

CROSS-REFERENCE TO RELATED APPLICATIONS

The present application is related to co-pending U.S. patent application Ser. No. 13/033,317, entitled "Memory Protection in a Data Processing System," and filed on even date herewith, the entirety of which is incorporated by reference herein.

FIELD OF THE DISCLOSURE

The present disclosure relates generally to data processing systems, and more particularly to providing memory protection services in data processing systems.

BACKGROUND

Data processing systems often include one or more memory protection units (MPUs) to regulate access to memory devices. A MPU can intercept memory access requests issued by a device and determine whether the requesting device has requisite authority to access the memory. A MPU can be configured to grant or deny access to individual address regions by associating each region with corresponding access privileges using descriptors. In systems with multiple processor cores, each processor core can have its own local MPU that controls memory accesses initiated by that core using one or more local descriptors. In addition, a global MPU may grant or deny accesses initiated by each of the multiple processor cores, and other bus masters, using one or more global descriptors. However, the number of descriptors needed to support many non-contiguous ranges of memory having different access authorities can require significant resource space.

BRIEF DESCRIPTION OF THE DRAWINGS

The present disclosure may be better understood, and its numerous features and advantages made apparent to those skilled in the art, by referencing the accompanying drawings.

FIG. 4 is a table illustrating a region descriptor, such as a region descriptor shown at FIGS. 1-3, in accordance with a specific embodiment of the present disclosure.

DETAILED DESCRIPTION

Figure 1:
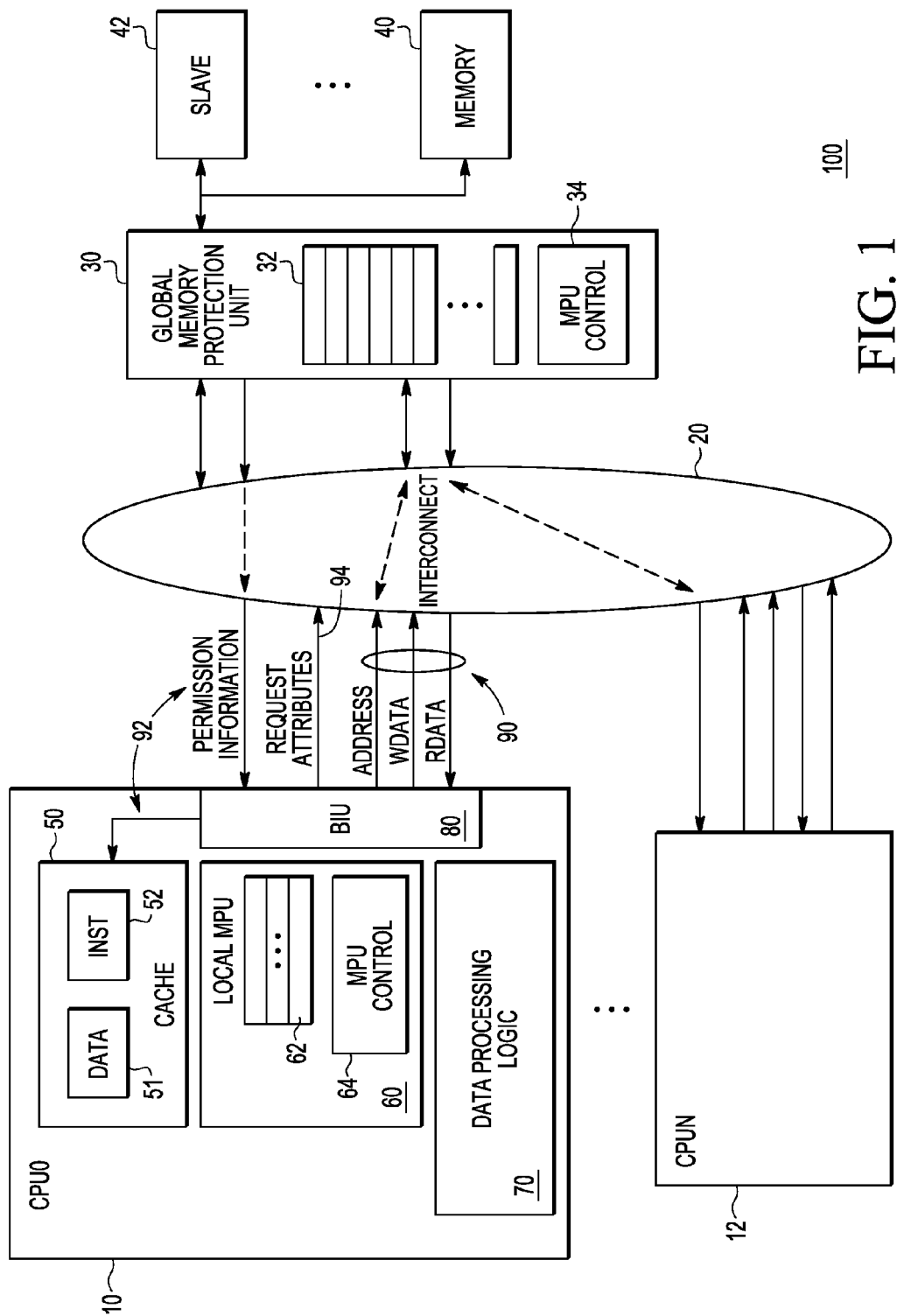
FIG. 1 is a block diagram illustrating a data processing system in accordance with a specific embodiment of the present disclosure.

FIGS. 1-12 illustrate example techniques for administering a memory access policy in a data processing system. A memory access policy can be implemented by one or more memory protection units (MPUs) included at a data processing system. A data processing system can include one or more processor cores and each processor core can include a local MPU. In addition, the data processing system can include a global MPU that can enforce a memory access policy in response to memory access requests issued by any processor core or any bus master. During operation of the data processing system, an execution unit at a processor core may issue a request to access a memory location. For example, the execution unit may issue a request to retrieve a program instruction or data information from a memory, or to store data information to a memory. A memory access policy determines whether to allow or deny the requested access. In an embodiment of the present disclosure, a local MPU and a global MPU together implement a comprehensive memory access policy. In another embodiment, the comprehensive memory access policy can be implemented by the local MPU based on not only local access permission information, but also upon global access permission information stored at a local cache memory, where the global access permission information was previously provided by a global MPU in response to a cache line fill operation. Therefore, a request to access a location within a memory can be granted or denied based on permission information stored at one or more MPUs and request attributes associated with the access request.

A memory access request is typically associated with execution by a processor device of a load instruction to retrieve information from a particular memory location, or execution of a store instruction to write information to a particular memory location. An address accompanies the memory access request to identify a location within a memory to be accessed. A load or store instruction can be included in a software program, and the software program can be executed in a supervisor mode or in a user mode. The execution of a software program can be referred to as a process, and a read or write access request can be associated with a process identifier (PID) assigned to the particular process being executed.

Information accessed during a memory read operation can include instructions or can include data information, while information associated with a memory write operation is generally data information. Accordingly, memory access requests can be characterized based on values of one or more request attributes. Examples of request attributes include an address attribute for indicating an address of a location to be accessed; a read attribute for indicating a request is a read request; a write attribute for indicating a request is a write request; a supervisor attribute for indicating a request is issued in supervisor mode; a user attribute for indicating a request is issued in user mode, a PID attribute for identifying a PID associated with a request; an instruction attribute for indicating that requested information is an instruction; and the like. Any number of request attributes can be associated with a memory access request.

A MPU generally includes one or more region descriptors, each region descriptor associated with a particular range of contiguous addresses (a region). Each region descriptor can include permission information identifying individual accessibility indicators, if any, that apply to locations included in a respective region. Therefore, individual region descriptors can be used to provide a specific degree of accessibility to corresponding address regions. An accessibility indicator is determined based on a corresponding value of a descriptor attribute. A region descriptor can include additional descriptor attributes whose values together determine if a region descriptor is valid and applicable with respect to a particular access request. Examples of descriptor attributes include an upper-bound address attribute and a lower-bound address attribute for indicating a range of addresses for which accessibility indicators provided by the region descriptor apply; a validity attribute for indicating whether or not the descriptor is valid; a SR attribute for indicating that locations within the region can be read by a process executed in supervisor mode; a SW attribute for indicating locations within the region can be written to by a process executed in supervisor mode; a UR attribute for indicating locations within the region can be read by a process executed in user mode; a UW attribute for indicating locations within the region can be written to by a process executed in user mode; attributes for indicating locations within the region can only be accessed by a process having a particular PID or having a PID included within specified ranges of PID values; and the like.

A region descriptor can include additional descriptor attributes that are not associated with accessibility indicators or with determining the applicability of a region descriptor with respect to a particular access request, as described below. For example, a guarded attribute can be included within a region descriptor to identify one or more locations whose state is volatile or whose state may change in response to or following an access, such a FIFO (a first-in first-out information buffer). Similarly, a cache-inhibit attribute can be included within a region descriptor to designate a corresponding range of addresses as non-cacheable, e.g., to indicate data retrieved from that regions should not be stored by a cache memory.

A memory access policy can allow or restrict access to particular locations at a memory based upon one or more accessibility indicators included in one or more region descriptors. For example, a store instruction executed by a process having a particular PID and executed in a supervisor mode can cause a memory access request to be issued that includes request indicators identifying the values of one or more of these request attributes. For example, the value of an address attribute is an address identifying a memory location in which to store information accompanying the access request. A write attribute is asserted to identify the access request as a write access request. A supervisor attribute is asserted to identify that a process issuing the request is a supervisor process. A value of a PID attribute identifies the PID associated with the process issuing the request. Continuing the present example, the access request including request indicators can be received at a MPU. The MPU can determine whether the value of the address associated with the access request is included within an address range specified by the upper and lower bound address attributes associated with one or more region descriptors. The MPU can further qualify the applicability of a region descriptor based on other accessibility indicators provided by the region descriptor, such as a value of a PID attribute, an instruction attribute, and the like. Having determined that a particular region descriptor is valid and applicable to the present access request, the MPU can allow the access to proceed or deny the request based on request indicators associated with the request and accessibility indicators associated with the region descriptor. In the present example, if the SW descriptor attribute at an applicable region descriptor is asserted, the MPU can allow the access. However, if the SW attribute is not asserted, the request can be denied.

A MPU may support a larger or a smaller number of region descriptors based on various cost and performance trade-offs. In an embodiment of the present disclosure, address ranges specified by two or more region descriptors can overlap. Therefore, a memory address associated with a memory access request can be included within the address range associated with more than one region descriptor. In a particular embodiment of the present disclosure, if multiple region descriptors included within a single MPU are determined to be applicable with respect to a particular access request based on values of descriptor attributes included in each region descriptor and values of request attributes associated with the request, the access can be allowed or denied based on a least-restrictive policy determined by accessibility indicators provided at all of the applicable region descriptors. For example, if two region descriptors are applicable to a particular access request and one descriptor is found to deny the access request but the other descriptor allows the access request, the access request is allowed, thereby allowing further processing of the access request. For example, when a read access is allowed, processing of the read access request will continue until the requested information is returned to the requesting source or until another process, such as another MPU, terminates the access request. When a read access is denied, processing of the read access is terminated. This behavior is in contrast to a most-restrictive policy wherein if two region descriptors are applicable to a particular request and one descriptor is found to deny the access but the other descriptor allows the access, the access is denied. In another embodiment, if multiple region descriptors included at different MPUs are determined to be applicable with respect to a particular access request, the effect is for an access to be allowed or denied based on a most-restrictive policy determined by accessibility indicators provided at all of the applicable region descriptors.

For example, a first region descriptor contained within a MPU can be configured to permit supervisor-write accesses to a large region of memory, while a second region descriptor at the same MPU can be configured to allow user-write accesses to a portion of the larger region. Based on a least-restrictive policy and based on an access request for which both region descriptors are applicable, either a supervisor-write access or a user-write access is allowed. For another example, a first region descriptor within a first MPU can be configured to permit supervisor-write accesses to a large region of memory, while a second region descriptor at a different MPU can be configured to disallow supervisor-write accesses to a portion of the larger region. Based on a most-restrictive policy and based on an access request for which both region descriptors are applicable, a supervisor-write access is denied, while for a least-restrictive policy a supervisor-write access is allowed.

In accordance with another embodiment, when a memory access request issued by a processor core is successfully completed, and the completion also results in a cache line at the processor core being filled (a line-fill), access permission information associated with the memory access request that is maintained at a global MPU at the time of the access can be stored in the cache line of the local processor core that is being filled. A subsequent memory access request that hits to the same cache line can be allowed or denied by a MPU local to the processor core based in part on the global permission information stored in the cache line, and based in part on permission information maintained in a local MPU included at the processor core.

A MPU can associate access permission information with specific memory addresses or with regions of memory addresses. Upon receipt of a memory access request directed towards a particular memory address, a MPU can evaluate whether the request attributes associated with the request satisfy access requirements associated with that memory address based on one or more accessibility indicators included in one or more region descriptors.

As used herein, a memory location is intended to refer to any data storage location having a unique system address. Such locations, including memory devices, peripheral devices, and the like, are included within a system address space. Similarly, the phrase memory access request is used herein to refer to any request to access a storage location based on a unique system address. For simplicity, memory-mapped storage locations and corresponding access requests described herein are referred to as memories and memory access requests, respectively.

FIG. 1 is a block diagram illustrating a data processing system 100 in accordance with a specific embodiment of the present disclosure. In the embodiment illustrated at FIG. 1, the data processing system 100 is a general purpose data processing device that can be incorporated into any of a number of electronic systems, including portable electronic devices, computer devices, automotive devices, communications devices, and the like. The processor cores 10 and 12 each includes circuitry configured to execute software and thereby perform a desired task.

Data processing system 100 includes a first processor core 10 identified as CPU 0, a second processor core 12 identified as CPU N, an interconnect 20, a global MPU 30, a memory device 40, and a slave device 42. The processor core 10 includes a cache 50, which further includes a data cache 51 and an instruction cache 52; a local MPU 60, which further includes region descriptors 62 and a MPU control module 64; a data processing logic module 70; and a bus interface unit (BIU) 80. The processor core 12 includes similar sub-components (not shown), and each processor core can include additional modules (not shown for clarity).

The global MPU includes region descriptors 32 and a MPU control module 34. The processor core 10 and the processor core 12 can communicate with the global MPU 30 via the interconnect 20. In particular, interconnect 20 may conduct signals to provide REQUEST INFORMATION 90, PERMISSION INFORMATION 92, and REQUEST ATTRIBUTES 94. The REQUEST INFORMATION 90 includes a memory address (ADDRESS), write data (WDATA), and read data (RDATA). The memory device 40 can provide storage locations accessible via memory access requests issued by the processor core 10 or the processor core 12. The memory device 40 can include any of a variety of memory types, including dynamic random access memory (DRAM), static random access memory (SRAM), and the like. The slave device 42 represents a memory mapped device, e.g., an input/output (I/O) device, which can be a target of a memory access request issued by the processor core 10 or the processor core 12. For clarity, FIG. 1 omits other components of the data processing system 100 whose operation is well known to those of ordinary skill in the art, such as high-level cache memory devices, external interfaces, and the like. Furthermore, the data processing system 100 can include a greater or a fewer number of processor cores.

During operation, processor cores 10 and 12 can access the memory 40 to obtain instructions, to retrieve data information, or to store data information. For example, the data processing logic module 70 at the processor core 10 may issue a memory access request to retrieve data information at a particular memory address at the memory 40. Before transmitting the memory access request external to the processor core 10, local MPU 60 can determine if the requesting device (or the software process from which the request originates) possesses suitable request indicators to allow the access. Furthermore, the processor core 10 can determine whether the desired data information is available within the data cache 51. If the local MPU 60 determines that the request is allowed, and the desired data information is not present at the data cache 51 (a cache miss), the memory access request is provided to the BIU 80. The BIU 80 is configured to forward the memory access request over the interconnect 20 to the global MPU 30. The BIU 80 can initiate a memory-read access request by transmitting a memory address via signal ADDRESS, a read command signal (not shown), and the REQUEST ATTRIBUTES 94 identifying values of other attributes associated with the request, such as request indicators. These signals are propagated via the interconnect 20 to the global MPU 30. The global MPU 30, operating in a similar manner as the local MPU 60, can further determine if the access request includes privileges necessary to access the memory location specified by the address. Having approved the access request, the global MPU 30 can access the desired location at the memory device 40 or the slave device 42 and return the requested data information to the BIU 80 and then data processing logic module 70 via the signal RDATA over the interconnect 20. In some embodiments, the global MPU 30 may not handle the actual transfer of data, but instead act as an access gate to memory 40 and slave device 42.

In a similar manner, the data processing logic module 70 at the processor core 10 may issue a memory access request to store data information to a particular memory address at the memory 40. Before transmitting the memory access request external to the processor core 10, local MPU 60 can determine whether to allow or deny the access based on values of request attributes associated with the request. If the local MPU 60 determines that request indicators accompanying the request meet the requirements of accessibility indicators maintained by the local MPU 60, the memory access request is provided to the BIU 80.

The BIU 80 can initiate a memory-write access request by transmitting a memory address via signal ADDRESS, the data information to be stored at the memory 40 via the signal WDATA, a write command signal (not shown), and the REQUEST ATTRIBUTES 94 identifying privileges associated with the request. The global MPU 30, operating in a similar manner as the local MPU 60, can further determine if the access request includes privileges necessary to store information at the memory location specified by the address. Having approved the access request, the global MPU 30 can access the desired location at the memory device 40, and store the data information provided by the processor core 10.

A memory access request to read or to write to the memory 40 can include additional information that can be communicated to the global MPU 30 via the signal REQUEST ATTRIBUTES 94 to indicate various request attributes associated with the access request. The REQUEST ATTRIBUTES 94 can include information identifying the source of the request and the type of the request, as described above. For example, the REQUEST ATTRIBUTES 94 can include an indication that the request is associated with a process running in supervisor mode or user mode, an indication that the request is to perform a read operation or a write operation, and the like. The REQUEST ATTRIBUTES 94 can include other information that can further characterize an associated memory access request in a particular way.

As described above, a MPU, such as the local MPU 60 and the global MPU 30, can maintain respective permission information associated with one or more address regions. The local MPU 60 enforces protections on instruction fetches and data read and write accesses by comparing a memory address associated with the memory access request with each entry in the local MPU 60 (stored within a region descriptor 62) to determine a match. If the local MPU 60 identifies a region descriptor corresponding to the memory address, accessibility indicators and other descriptor attributes included in that region descriptor can be evaluated. In one embodiment, the local MPU 60 provides permission information for a relatively small number of memory address regions compared to the number of regions that can be supported by the global MPU 30. Accessibility indicators can relate to any number of request attributes that together define aspects of a protection policy. For example, a region descriptor can designate that locations included within a particular memory address region are write protected, in which case a request to store information, e.g., a request with an attribute that indicates information is to be stored, at a location within the region is denied while a request to retrieve information, e.g., a request with an attribute that indicates information is to be read, from a location within the region is allowed. Similarly, a region descriptor can designate that locations included within a memory address region are accessible only to access requests associated with an attribute that indicates the access request was issued by a process running in supervisor mode.

The global MPU 30 also may be referred to as a system MPU. In one embodiment, global MPU 30 supports a greater number of entries (based on the number of region descriptors 32) than the local MPU 60. The global MPU 30 can evaluate all memory access requests communicated over the interconnect 20, and determines whether each requested access should be allowed or denied based on permission information included therein. These memory access requests can be issued by the processor core 10, the processor core 12, or by other system devices coupled to the interconnect 20 (not shown). A system device issuing a memory access request, such as the processor core 10, can be referred to as a bus master. The global MPU 30 monitors access requests from all bus masters and enforces protections on a per-master basis. Each region descriptor in the global MPU 30 defines an address range, and permission information for each potential bus master. Access protections are enforced on each access request by comparing request attributes associated with an access produced by a bus master to the permission information (accessibility indicators) stored by the global MPU 30. The MPU 30 can either allow or deny the requested access in a manner similar to that previously described with reference to the local MPU 60. If the access is allowed, the request can be forwarded to a memory controller (not shown) that performs the requested memory access transaction at the memory device 40, at the slave device 42, or at another memory mapped device (not shown). If the global MPU 30 denies the access request based on permission information included therein, the global MPU 30 can instead provide an access termination error response or another form of exception indicator to the device or processor core that initiated the access request.

In an embodiment, the global MPU 30 provides permission information to a processor core. In particular, in response to a successfully completed memory access, and in response to initiating a cache line refill operation for a cache included in the processor core from which the access request originated, the global MPU 30 provides permission information associated with the accessed memory location to the processor core. The permission information is stored in the cache line along with other tag and data information. In response to a subsequent access request that hits to that particular cache line, the access can be allowed or denied based on both the permission information stored in the cache line and permission information stored in the local MPU. In an embodiment, if permission information applicable to an access request is provided by a cache memory and by a local MPU, the more restrictive policy is utilized. In an embodiment, if two or more region descriptors included in a local MPU each apply to an access, the descriptor providing the least-restrictive access policy can initially prevail. The access can then be allowed or denied based on the more restrictive of the prevailing policy from the local MPU and permission information provided by the cache memory.

Figure 2:
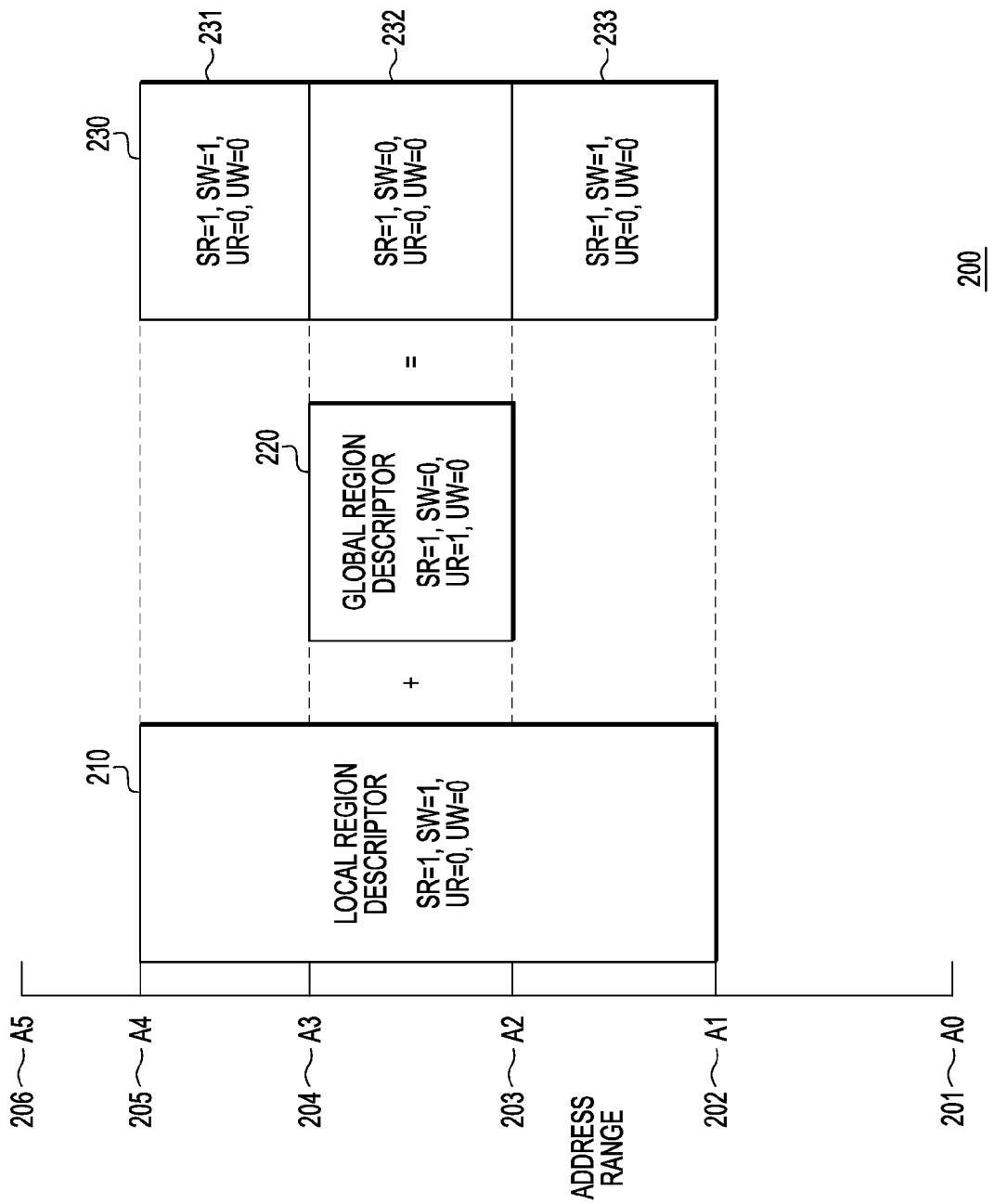
FIG. 2 is a graph illustrating a method for determining memory access permissions based on permission information included at multiple MPU devices in accordance with a specific embodiment of the present disclosure.

As previously described, a particular address associated with a memory access request may be included within more than one memory address region specified by corresponding MPU region descriptors. FIG. 2 is a graph 200 illustrating a method for determining memory access permissions based on permission information included in multiple MPU devices in accordance with a specific embodiment of the present disclosure. The graph 200 includes a vertical axis representing a range of memory addresses. For example, the address range extending from address 201 (A0) to address 206 (A5) can represent the entire range of addressable locations for the data processing system 100 of FIG. 1. The graph 200 includes a representation of a first region descriptor 210 associated with a local MPU, and a second region descriptor 220 associated with a global MPU. For example, the region descriptor 210 can represent a region descriptor in the local MPU 60 of FIG. 1, and the region descriptor 220 can represent a region descriptor in the global MPU 30 of FIG. 1. The graph 200 also illustrates combined access permission information 230 resulting from the combination of permission information provided by the local region descriptor 210 and by the global region descriptor 220.

The local region descriptor 210 provides accessibility indicators associated with a region of memory address space extending from an address 202 (A1) to an address 205 (A4). In particular, the local region descriptor 210 specifies that locations within this region can be both read and written by a process having supervisor privileges (supervisor-read SR=1 and supervisor-write SW=1), but cannot be read or written by a process having user privileges (user-read UR=0 and user-write UW=0). The global region descriptor 220 provides accessibility indicators associated with a region of memory address space extending from an address 203 (A2) to an address 204 (A3), which overlaps and is a subset of the region specified by the local region descriptor 210. The global region descriptor 220 specifies that locations within this region can be read, but not written by a process having supervisor privileges (supervisor-read SR=1 and supervisor-write SW=0), and can be read but not written, by a process having user privileges (user-read UR=1 and user-write UW=0).

The combined (comprehensive) permission information 230 includes a region 231 extending from the address 204 (A3) to the address 205 (A4), a region 232 extending from the address 203 (A2) to the address 204 (A3), and a region 233 extending from the address 202 (A1) to the address 203 (A2). Access permissions associated with the regions 231 and 233 are determined based only on the accessibility indicators associated with the local region descriptor 210 because no other region descriptor, local or global, defines alternate access permissions for these regions. Therefore, the access permissions governing the region 231 and region 233 are SR=1, SW=1, UR=0, and UW=0 (supervisor requests to perform both write and read operations are allowed, while user requests to read or write are not allowed). Addresses corresponding to region 232 are included within regions specified by both the local region descriptor 210 and the global region descriptor 220. The combined permissions associated with the region 232 are determined based on a most-restrictive policy by selecting the more restrictive accessibility indicators specified by either of the two applicable region descriptors. For example, the local region descriptor 210 does not permit user-read accesses while the global region descriptor does allow user-read accesses. Based on a most-restrictive policy, user-read accesses are denied. Therefore, the access permissions associated with region 232 are SR=1, SW=0, UR=0, and UW=0 (only supervisor-read requests are allowed).

Figure 3:
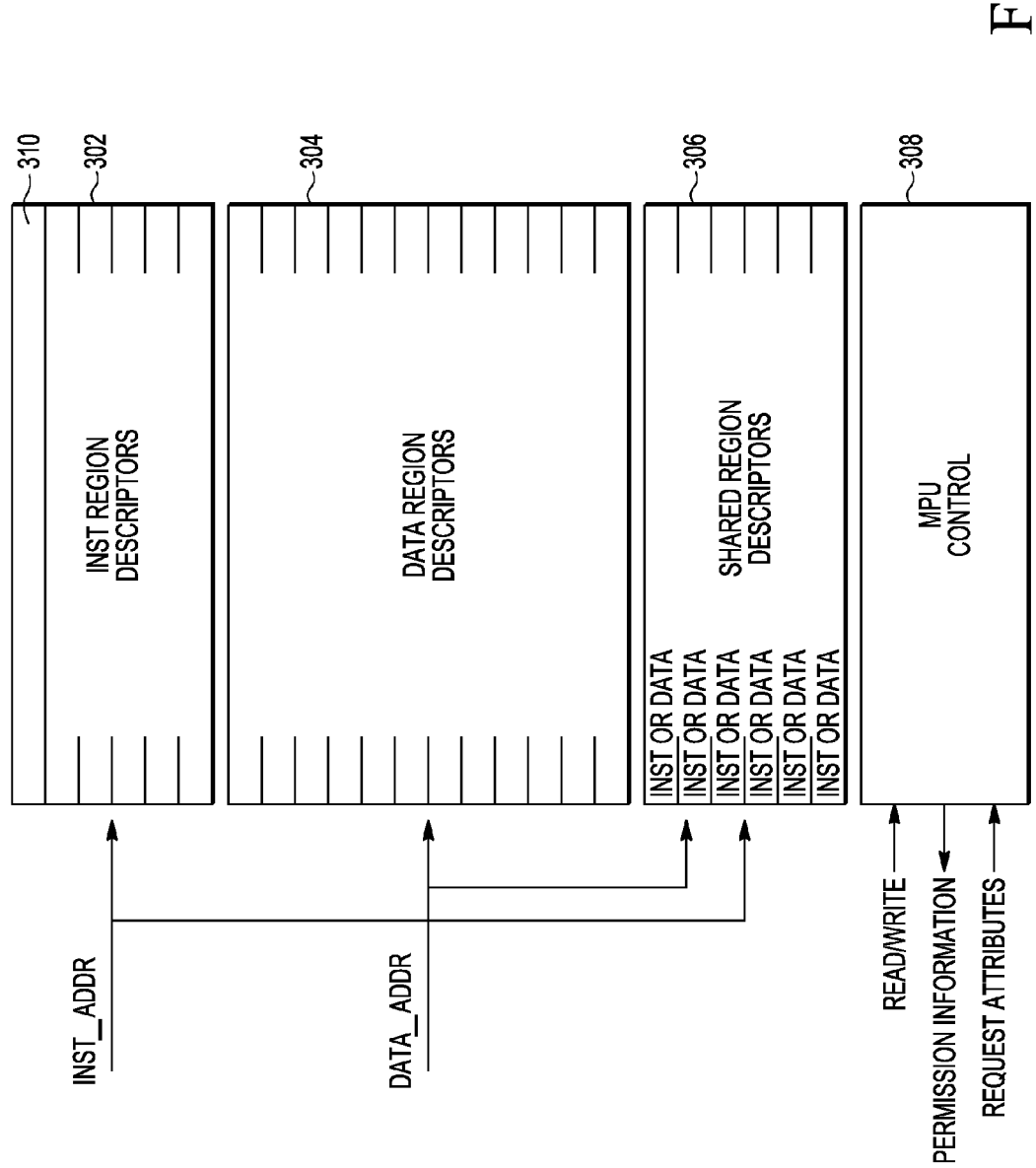
FIG. 3 is a block diagram illustrating a memory protection unit (MPU), such as the MPUs included at the data processing system in FIG. 1, in accordance with a specific embodiment of the present disclosure.

The operation of local MPU 60 and global MPU 30 may be better understood with reference to FIG. 3 and FIG. 4. FIG. 3 is a block diagram illustrating a MPU 300 in accordance with a specific embodiment of the present disclosure, and which may represent the local MPU 60 or the global MPU 30 included in the data processing system. The MPU 300 includes a set of instruction region descriptors 302, a set of data region descriptors 304, and a set of shared (instruction and data) region descriptors 306. Each of the sets of region descriptors includes one or more region descriptors, such as region descriptor 310. The MPU 300 also includes a MPU control module 308. The MPU control module 308 operates to selectively allow or deny each requested memory access based on an address and privilege attributes associated with the request, based on whether the access is a read access or a write access, and based on one or more region descriptors included in sets 302, 304, and 306. As previously described, the REQUEST ATTRIBUTES 94 can include an indication of whether the device or software process initiating the access request has supervisor privileges or instead has only user privileges, and may include other attributes, such as a bus master identification number and the like. In response to a successfully completed memory access, the MPU control module 308 can provide permission information associated with the request to the requesting device, e.g., for storage in a cache memory as described earlier. If a memory access request is denied, the MPU control module 308 can return a termination error response to the requesting device indicating that a memory access exception has occurred.

FIG. 4 is a table illustrating a region descriptor 410 in accordance with a specific embodiment of the present disclosure. Region descriptor 410 is a specific embodiment of region descriptor 310 as well as other region descriptors included in region descriptor sets 302, 304, and 306 of FIG. 3. Region descriptor 410 includes a plurality of fields, 420-429. Field 420 relates to a validity attribute, V. A region descriptor is invalid if a corresponding valid bit is not asserted. If the valid bit is asserted and the address range associated with the region descriptor includes the address associated with a request, permission information included in the region descriptor can be considered in response to a memory access request. Fields 421, UPPER BOUND, and 422, LOWER BOUND, relate to an upper-bound address attribute and a lower-bound address attribute, respectively, for indicating a relevant address range of the descriptor. For example, the lower-bound of region descriptor 210 of FIG. 2 is address 202 (A1) and the upper-bound of region descriptor 210 is address 205 (A4). Field 423 includes a set of bits, TID(0:7), relating to a task identifier attribute. A region descriptor is only considered pertinent when a value of a PID request attribute accompanying a memory access request matches the value of task identifier 423. Field 424 includes a set of bits, TIDMSK (0:7), relating to a task identification mask attribute. Bits included in a task identifier mask are asserted to indicated that corresponding bits of the TID(0:7) value should be ignored when determining if a region descriptor 210 is valid for an access having a particular PID value.

Field 425 relates to an instruction attribute, INST, which can be asserted to identify that the region descriptor is only valid for instruction accesses, e.g., access requests wherein a corresponding instruction request attribute is also asserted. Accordingly, a corresponding instruction attribute is asserted at region descriptors included in set 302 (instruction region descriptors), and negated in region descriptors included in set 304 (data region descriptors). Field 426 relates to a plurality of accessibility attributes including a SX attribute (supervisor execute), a SW attribute (supervisor write), and a SR attribute (supervisor read), which can be individually asserted to identify the types of supervisor level access requests that are allowed by the descriptor to locations included within the address region specified by region descriptor 410. For example, if the SW attribute is asserted, an access request identified as both a supervisor access and a write access (by assertion of corresponding request attributes accompanying the request) is permitted by the descriptor to store information to locations within the associated memory address region. Similarly, if the SR attribute is asserted, an access request identified as both a supervisor access and a read access is permitted by the descriptor to read locations with the associated region. Attribute SX identifies whether locations within the associated region can be executed. Field 427 relates to a plurality of accessibility attributes including a UX attributes (user execute), a UW attribute (user write), and a UR attribute (user read), which individually identify the types of user level access requests that are permitted by the descriptor to locations corresponding to region descriptor 410.

Field 428 relates to a cache-inhibit region attribute, I. The cache-inhibit region attribute can be asserted to instruct a requesting device to not store information retrieved from locations within the associated region in a cache device, such as data cache 51 and instruction cache 52 of FIG. 1. Field 429 relates to a guarded region attribute, G. The guarded region attribute can be asserted to indicate that locations included within the associated region operate differently than a normal memory element or register. For example, a memory mapped location whose value can change following or in response to an access, such as a FIFO, a volatile storage element, and the like. Accordingly, information associated with a guarded location typically is not stored in a cache memory device.

During operation of a MPU, such as local MPU 60 and global MPU 30, an incoming memory access request is evaluated. For example, REQUEST INFORMATION 90 and REQUEST ATTRIBUTES 94 received from BIU 80 can be evaluated to determine an address of a location to be accessed, a PID associated with the request, whether the requesting device or process has supervisor or only user privileges, whether the request is a read access or write access, and whether the request is an instruction access or a data access. A region descriptor can include additional fields corresponding to other request attributes or to identify or further qualify an access request in a desired way. The MPU examines each valid region descriptor included within the MPU to determine if any region descriptor is relevant with respect to the received access request. If the MPU identifies a region descriptor that matches the incoming access request, the MPU either allows or denies the access based on the request attributes and based on permissions specified by the descriptor. For example, if a user-mode request to write to address XYZ is received, and a valid region descriptor defines an address region that includes address XYZ, the requested access can be allowed if the UW attribute is asserted, and denied if the UW attribute is not asserted. Furthermore, if a region descriptor is determined to have governance over an access, the access can be identified as a cache-inhibit access or a guarded access based on the values of the I and G fields in the descriptor, respectively.

Figure 5:
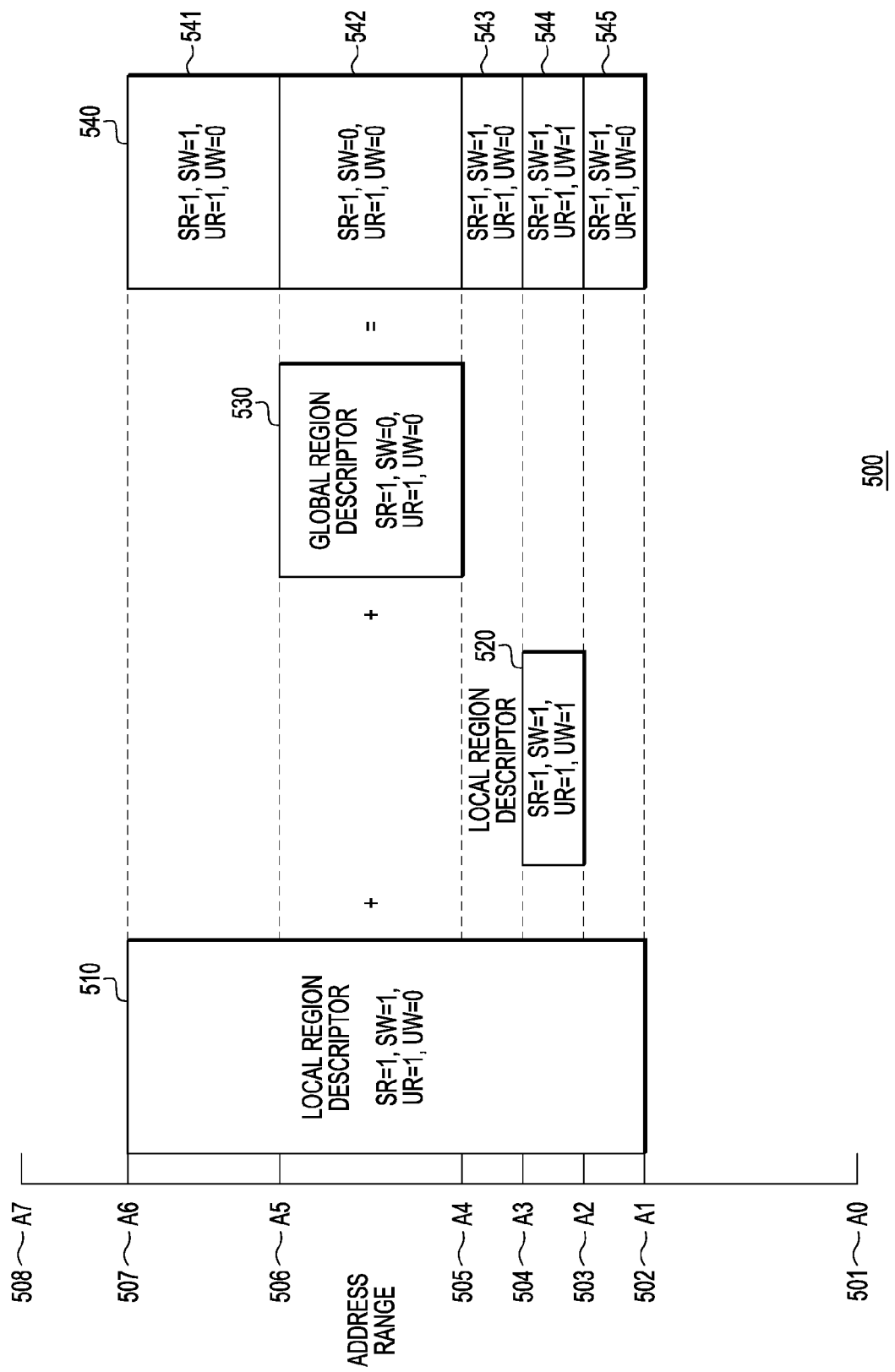
FIG. 5 is a graph illustrating a method for determining memory access permissions based on multiple valid MPU region descriptors in accordance with a specific embodiment of the present disclosure.
Figure 6:
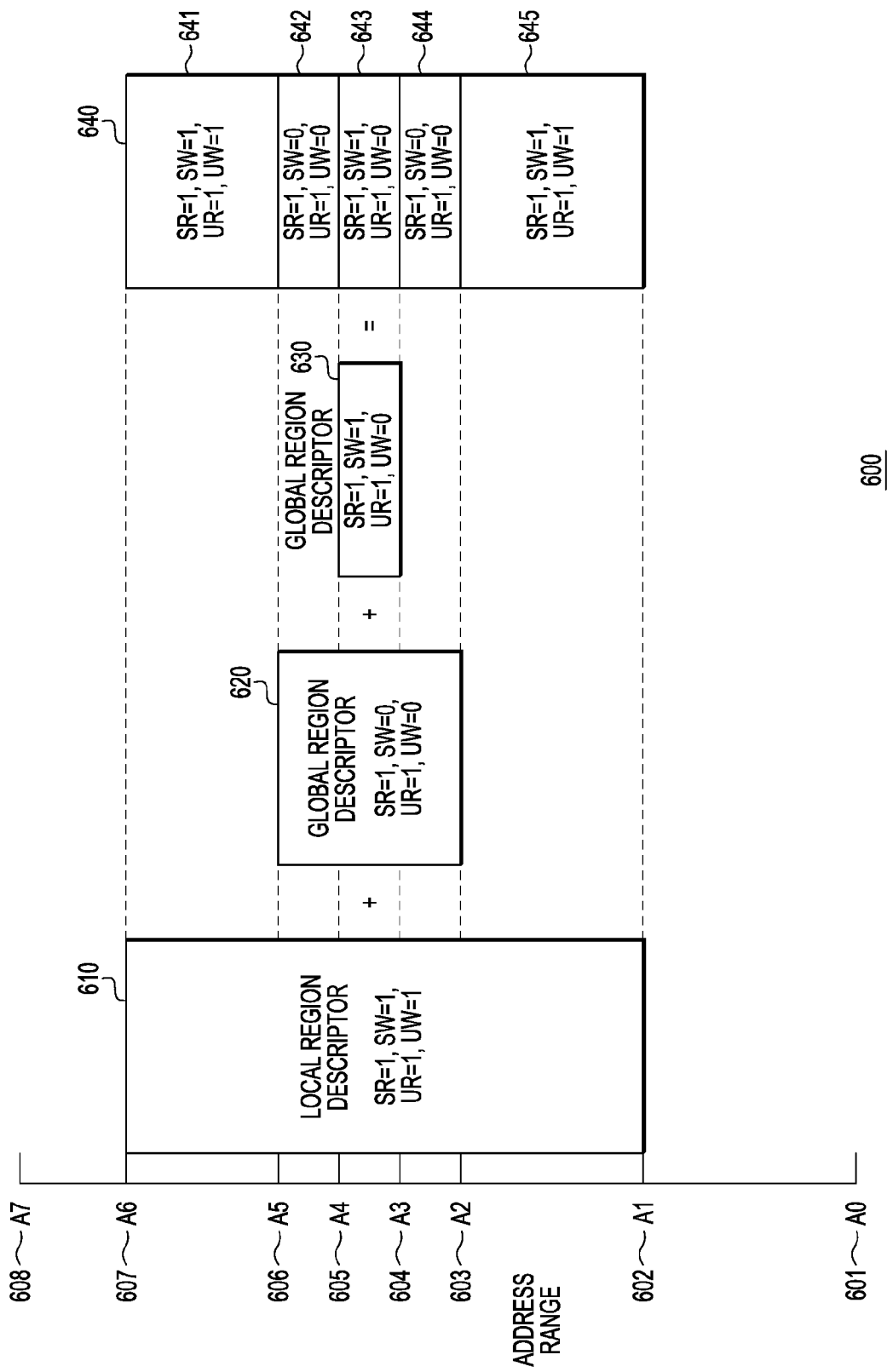
FIG. 6 is a graph illustrating a method for determining memory access permissions based on multiple valid MPU region descriptors in accordance with another embodiment of the present disclosure.

As described above, a single MPU can include more than one descriptor that matches a particular memory access request. For example, two region descriptors included in a MPU can specify memory address regions that overlap so that an address associated with a memory access request can be included within the address bounds defined by both descriptors. FIGS. 5 and 6 illustrate how a memory protection policy can be determined when a MPU identifies two or more region descriptors that apply to a particular memory access request.

FIG. 5 is a graph 500 illustrating a method for determining memory access permissions based on multiple valid MPU region descriptors in accordance with a specific embodiment of the present disclosure. In particular, graph 500 illustrates how access permissions can be determined if two region descriptors match parameters associated with a memory access request. In a first case, two matching region descriptors are associated with a single MPU. In a second case, each of two matching region descriptors is associated with different MPUs. Graph 500 includes a vertical axis representing a range of memory addresses. For example, the address range extending from address 501 (A0) to address 508 (A7) can represent the total addressable memory address space of data processing system 100 of FIG. 1. Graph 500 includes a representation of a first local region descriptor 510, a second local region descriptor 520, and a global region descriptor 530. For example, local region descriptors 510 and 520 can represent region descriptors included in local MPU 60 of FIG. 1, and global region descriptor 530 can represent a region descriptor in global MPU 30 of FIG. 1. Graph 500 also illustrates combined access permission information 540 resulting from the combination of permission information provided by local region descriptors 510 and 520 and by global region descriptor 530.

The local region descriptor 510 provides accessibility indicators associated with a region of memory address space extending from an address 502 (A1) to an address 507 (A6). In particular, local region descriptor 510 specifies that locations within this region can be both read and written by a process having supervisor privileges (supervisor-read SR=1 and supervisor-write SW=1), and can be read but not written by a process having user privileges (user-read UR=1 and user-write UW=0). The local region descriptor 520 provides accessibility indicators associated with a region of memory address space extending from an address 503 (A2) to an address 504 (A3), which overlaps and is a subset of the region specified by the local region descriptor 510. The local region descriptor 520 specifies that locations within this region can be both read and written by a process having supervisor privileges (supervisor-read SR=1 and supervisor-write SW=1), and can be both read and written by a process having user privileges (user-read UR=1 and user-write UW=1). The global region descriptor 530 provides accessibility indicators associated with a region of memory address space extending from an address 505 (A4) to an address 506 (A5), which overlaps and is a subset of the region specified by the local region descriptor 510. The global region descriptor 530 specifies that locations within this region can be read but not written by a process having supervisor privileges (supervisor-read SR=1 and supervisor-write SW=0), and can be read but not written by a process having user privileges (user-read UR=1 and user-write UW=0).

The combined access information 540 includes a region 541 extending from the address 506 (A5) to the address 507 (A6), a region 542 extending from the address 505 (A4) to the address 506 (A5), a region 543 extending from the address 504 (A3) to the address 505 (A4), a region 544 extending from the address 503 (A2) to the address 504 (A3), and a region 545 extending from the address 502 (A1) to the address 503 (A2). Access permissions associated with the regions 541, 543, and 545 are determined based on the accessibility indicators associated with the local region descriptor 510 because no other region descriptor, local or global, defines alternate access permissions for these regions. Therefore, the access permissions governing regions 541, 543, and 545 are SR=1, SW=1, UR=1, and UW=0. Addresses corresponding to region 542 are included within regions specified by both the local region descriptor 510 and the global region descriptor 530. The combined permissions associated with the region 542 are determined on the basis of a most-restrictive policy. Therefore, the accessibility indicators associated with region 542 are SR=1, SW=0, UR=1, and UW=0. Accordingly, the global descriptor 530 provides a smaller region 542 having more restrictive permissions that those provided by the larger local region descriptor 510.

Addresses corresponding to region 544 are included within regions specified by both the local region descriptor 510 and the local region descriptor 520. The combined permissions associated with the region 544 are determined based on a least-restrictive policy. Therefore, the access permissions associated with region 544 are SR=1, SW=1, UR=1, and UW=1. Accordingly, the local descriptor 520 provides a smaller region 544 having less restrictive permissions that those provided by the larger local region descriptor 510.

FIG. 6 is a graph 600 illustrating a method for determining memory access permissions based on multiple valid MPU region descriptors in accordance with another embodiment of the present disclosure. In particular, graph 600 illustrates how access permissions can be determined if two region descriptors of one MPU and a third region descriptor of a second MPU all match parameters associated with a memory access request. The graph 600 includes a vertical axis representing a range of memory addresses. For example, the address range extending from address 601 (A0) to address 608 (A7) can represent the total addressable memory address space of data processing system 100 of FIG. 1. The graph 600 includes a representation of a local region descriptor 610, a first global region descriptor 620, and a second global region descriptor 630. For example, the local region descriptor 610 can represent a region descriptor included in the local MPU 60 of FIG. 1, and the global region descriptors 620 and 630 can represent region descriptors in the global MPU 30 of FIG. 1. The graph 600 also illustrates combined access permission information

640 resulting from the combination of permission information provided by the local region descriptors 610 and by the global region descriptors 620 and 630.

The local region descriptor 610 provides accessibility indicators associated with a region of memory address space extending from an address 602 (A1) to an address 607 (A6). In particular, accessibility indicators included in the local region descriptor 610 specify that locations within this region can be both read and written by a process having supervisor privileges (supervisor-read SR=1 and supervisor-write SW=1), and can be both read and written by a process having user privileges (user-read UR=1 and user-write UW=1). The first global region descriptor 620 provides accessibility indicators associated with a region of memory address space extending from an address 603 (A2) to an address 606 (A5), which overlaps and is a subset of the region specified by the local region descriptor 610. Accessibility indicators included in the first global region descriptor 620 specify that locations within this region can be read but not written by a process having supervisor privileges (supervisor-read SR=1 and supervisor-write SW=0), and can be read but not written by a process having user privileges (user-read UR=1 and user-write UW=0). The second global region descriptor 630 provides accessibility indicators associated with a region of memory address space extending from an address 604 (A3) to an address 605 (A4), which overlaps and is a subset of both the region specified by the local region descriptor 610 and the region specified by the global region descriptor 620. Accessibility indicators included in the global region descriptor 630 specify that locations within this region can be both read and written by a process having supervisor privileges (supervisor-read SR=1 and supervisor-write SW=1), and can be read but not written by a process having user privileges (user-read UR=1 and user-write UW=0).

The combined access information 640 includes a region 641 extending from the address 606 (A5) to the address 607 (A6), a region 642 extending from the address 605 (A4) to the address 606 (A5), a region 643 extending from the address 604 (A3) to the address 605 (A4), a region 644 extending from the address 603 (A2) to the address 604 (A3), and a region 645 extending from the address 602 (A1) to the address 603 (A2). Access permissions associated with regions 641 and 645 are determined based on the accessibility indicators associated with the local region descriptor 610 because no other region descriptor, local or global, defines alternate access permissions for these regions. Therefore, the access permissions governing the region 641 and 645 are SR=1, SW=1, UR=1, and UW=1. Addresses corresponding to region 642 and 644 are included within regions specified by both the local region descriptor 610 and the first global region descriptor 620. The combined permissions associated with each of regions 642 and 644 are determined based on a most-restrictive policy. Therefore, the access permissions associated with regions 642 and 644 are SR=1, SW=0, UR=1, and UW=0. Accordingly, the global descriptor 620 provides two smaller regions 642 and 644 having more restrictive permissions that those provided by the larger local region descriptor 610.

Addresses corresponding to region 643 are included within regions specified by the local region descriptor 610, the first global region descriptor 620, and the second global region descriptor 630. The combined permissions associated with region 643 are first determined by the region descriptors 620 and 630 based on a least-restrictive policy because these two region descriptors are included within the same MPU. Next, permissions specified by the local region descriptor 610 are compared to the permissions previously determined based on the global region descriptors 620 and 630, and final combined permissions are determined based on a most-restrictive policy. Therefore, the access permissions associated with region 643 are SR=1, SW=1, UR=1, and UW=0. In this particular example, the first global region descriptor 620 specifies that no writes of any kind can be allowed within the address range between the address 603 (A2) and the address 606 (A5); however, the global region descriptor 630 has re-opened supervisor write accessibility within the address region extending from the address 604 (A3) to the address 605 (A4).

Figures 7, 8:
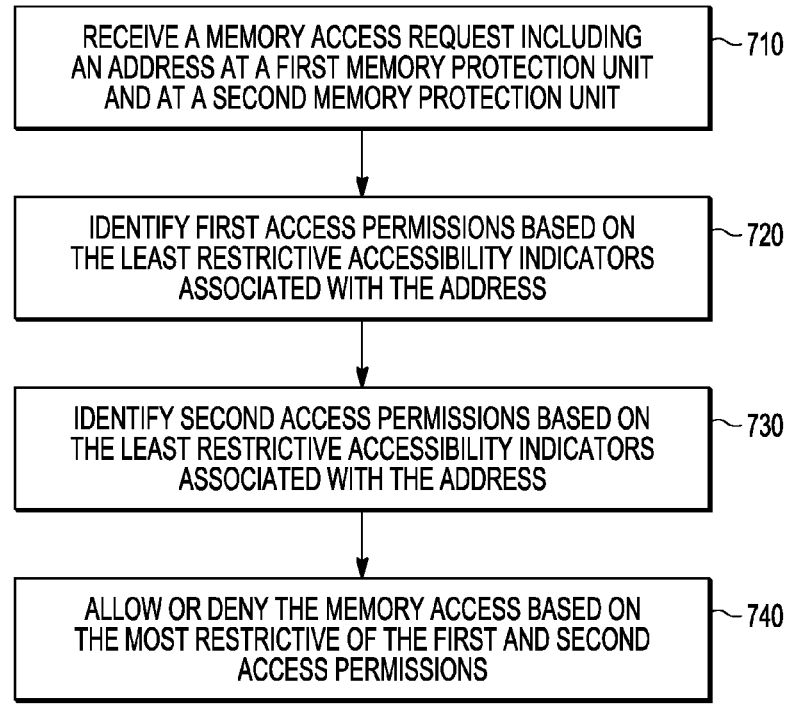
FIG. 7 is a flow diagram illustrating a method in accordance with a specific embodiment of the present disclosure.
FIG. 8 is a table illustrating permission information stored at a cache memory in accordance with a specific embodiment of the present disclosure.

FIG. 7 is a flow diagram illustrating a method 700 in accordance with a specific embodiment of the present disclosure. Method 700 can be used to perform the operation illustrated in FIGS. 2, 5, and 6. The method 700 begins at block 710 where a memory access request is received by at a first MPU and a second MPU. The memory access request includes a memory address specifying a location to be accessed. For example, the local MPU 60 can receive a memory access request from the data processing logic 70 of processor core 10 of FIG. 1, and the global MPU 30 can receive a representation of that request via the BIU 80. At block 720, the first MPU determines first access permissions based on the least-restrictive accessibility indicators specified by one or more region descriptors included in the first MPU. For example, an address included within the region between the address 503 (A2) and the address 504 (A3) in FIG. 5 matches the region descriptor 510 and the region descriptor 520, both included in a single MPU, such as the local MPU 60 of FIG. 1. The region descriptor 510 does not allow user-write accesses while the region descriptor 520 does permit such accesses. Therefore, user-write accesses are permitted based on a least-restrictive policy.

At block 730, the second MPU determines second access permissions based on the least-restrictive accessibility indicators specified by one or more descriptors included in the second MPU. For example, an address included within the region between the address 604 (A3) and the address 605 (A4) of FIG. 6 matches the region descriptor 620 and the region descriptor 630, which are both included in a single MPU, such as the global MPU 30 of FIG. 1. The region descriptor 620 does not allow supervisor-write accesses while the region descriptor 630 does allow such accesses. Therefore, supervisor-write accesses are permitted based on a least-restrictive policy.

At block 740, the requested memory access can be allowed or denied based on the most-restrictive of the first and second access permissions. Continuing the previous example, and still referring to FIG. 6, memory permissions associated with the region 643 are determined using a most-restrictive policy based on the first and second permissions. Therefore, user-write accesses are denied.

In an embodiment, a least-restrictive policy can be administered by selecting the least-restrictive of two or more descriptors and determining combined permissions based solely on permissions granted by the least-restrictive descriptor. Similarly, a most-restrictive policy can be administered by selecting the most-restrictive of two or more descriptors and determining combined permissions based solely on permissions granted by the most-restrictive descriptor. One skilled in the art will appreciate that other permission attributes can be substituted or included with those described above without departing from the scope of the present disclosure. The determination of the relative degree of restriction can be based on specific needs and operation of a particular system.

As described above, a region descriptor can include descriptor attributes identifying whether locations included within an associated range of addresses are cache-inhibited or guarded. In an embodiment, if a region is identified as a cache-inhibited region, the cache-inhibit attribute of an access is determined based on the protocol described above. For example, if two or more region descriptors specify an address range that includes the address associated with a request, a least-restrictive policy is used to determine whether the access is cache-inhibited. However, if a region is identified as a guarded region, a most-restrictive policy is always used to determine the guarded attribute of an access. Accordingly, a small guarded region can be defined within a relatively larger non-guarded region. The small guarded region can include more restrictive permissions than the larger region, and memory access requests associated with addresses included within the smaller guarded region can be allowed or denied based on the more restrictive permission policy provided by the smaller region. Operation when one or more region descriptors includes a cache-inhibit attribute or a guarded attribute is described below with reference to FIG. 12.

The techniques described above can be used to minimize the total number of regions descriptors required to implement a desired protection policy. The number of region descriptors included in a local MPU can be reduced further by storing a portion of permission information maintained by a global MPU in a cache memory included in a processor core, such as in the data cache 51 and the instruction cache 52 of data processing system 100 of FIG. 1. For example, a memory access request that results in data information being stored in a cache line of a data cache of a processor core may have been associated with a device or software process having supervisor level access privileges, while a subsequent memory access request that happens to hit to that cache line may possess only user level access privileges. Therefore, a local MPU typically oversees cache memory access to determine whether the requesting device or process has sufficient privileges to access the memory address specified by the request.

As described above, the original memory access request that resulted in the cache-line fill of the present example may have been allowed based on permission information, in part, maintained by a global MPU. Typically, global permission information associated with the original request would be replicated at the local MPU in order for the processor core to regulate access to the cached data information. Instead, according to a particular embodiment of the present disclosure, permission information governing the original memory access request, and originally maintained by a global MPU, can be stored in the cache line along with the requested information. The global permission information stored in a cache line can include one or more individual accessibility indicators associated with the original access, or may include other accessibility indicators, e.g., one or more encoded representations of the global accessibility indicators. In response to a subsequent memory access request and the determination that the requested information resides in a cache memory (a cache hit), the permission information previously stored in the associated cache line can be evaluated along with applicable permission information provided by a local MPU, and both sets of permission information can be used to determine whether the subsequent access should be allowed or whether the request should be denied. This allows the enforcement of the policy of applying the most-restrictive set of permissions provided by both a local MPU and a global MPU, without the requirement of querying the global MPU for every access. Since accesses that result in a cache hit are not propagated to the global MPU via the BIU, but instead are satisfied directly by the cache, storage of the global access permissions information in the cache line corresponding to the access address allows for proper enforcement of the desired policies.

In an embodiment, permission information can be stored in each cache line included in an instruction cache and in a data cache. Because, in one embodiment, a cache line can include multiple information words, the permission information applies equally to all the words within a respective cache line. In an alternate embodiment, a plurality of permission information may be stored in order to allow specific access permission information to be applied to individual words or other units of storage within a cache line. In yet another embodiment, a cache line may contain only a single word of information. In an embodiment, permission information stored in each cache line of an instruction cache or data cache can include a supervisor-only access control flag (SO). The SO flag is updated on completion of a cache line-fill operation based on permission information provided by a global MPU. The SO flag is asserted to indicate that a device or software process having only user-level privileges cannot access data or instruction information included in the corresponding cache line. For example, the SO flag is asserted if either the SW or the SR global accessibility indicator is asserted, and the UW and the UR accessibility indicators are both negated. Furthermore, permission information stored in each cache line of a data cache also includes a supervisor-write (SW) access control flag and a user-write (UW) access control flag. The SW and UW flags are updated on completion of a cache line-fill operation by a data cache based on permission information provided by a global MPU. The SW flag is asserted to indicate that data information can be stored at an associated location and in the respective cache line if the requesting device or software process has supervisor privileges. Similarly, the UW flag is asserted to indicate that data information can be stored if the requesting device or software process has user privileges.

Upon receipt at a data cache of a memory request, and in response to determining that the location associated with the request is represented at the data cache and is valid (a cache hit), values of the SO, SW and UW flags stored in a cache line corresponding to the request address can be evaluated to determine whether the access should be allowed or whether an access violation exception should be signaled. For example, if a cache hit occurs in response to a supervisor-level request to perform a write operation and the stored SW bit of a cache line associated with the request address is cleared, an exception is generated and the access is aborted. Similarly, if a cache hit occurs in response to a user-level request to perform a read or a write operation and the stored SO bit is set, indicating supervisor-only permissions for the addressed location, an exception is generated and the access is aborted. Similarly, if a cache hit occurs in response to a user-level request to perform a write operation and the stored UW bit is cleared or the stored SO bit is set, an exception is generated and the access is aborted.

The operation of the cache permission information flags can be better understood with reference to FIG. 8. FIG. 8 is a table 800 illustrating permission information stored in a cache memory in accordance with a specific embodiment of the present disclosure. The table 800 includes columns 801, 802, 803, and 804, and rows 810, 811, 812, 813, 814, and 815. The columns 801-803 represent the three permission information flags included in a cache line, such as a cache line of data cache 51 in the data processing system 100 of FIG. 1. As described above, only the supervisor-only flag, SO, is included in a cache line of an instruction cache.

The column 801 represents the permission information flag SO (supervisor-only), the column 802 represents the flag SW (supervisor-write), and the column 803 represents the flag UW (user-write). The rows 810-815 illustrate permissible combinations of the flags, and the column 804 provides a description of allowed accesses based on each respective combination of flags. During operation of data processing system 100 of FIG. 1, if an address associated with a memory access request is determined to be present and valid in a cache memory, the access can be allowed or the request can be denied based in part on the permission information flags associated with the cache line containing the requested information.

The row 810 corresponds to the flag combination: SO=0; SW=0; and UW=0. A cache line having this particular combination of flags can be read but not written by both a supervisor level request and by a user level request. Because permission flag SO is not asserted, information stored in the corresponding cache line is not limited to only supervisor level requests. Permission flag SW is not asserted, indicating that information stored in the corresponding cache line cannot be written by a request having supervisor level privileges. Similarly, permission flag UW is not asserted, indicating that information stored in the corresponding cache line cannot be written by a request having user level privileges. The row 811 corresponds to the flag combination: SO=0; SW=0; and UW=1. A cache line having this particular combination of flags can be read but not written by a supervisor level request, but can be written and read by a user level request. One skilled in the art will appreciate that this combination, wherein a user level request has less restrictive access privileges than a supervisor level request, is typically not encountered in practice.

The row 812 corresponds to the flag combination: SO=0; SW=1; and UW=0. A cache line having this particular combination of flags can be read or written by a supervisor level request, but can be only be read by a user level request. The row 813 corresponds to the flag combination: SO=0; SW=1; and UW=1. A cache line having this particular combination of flags can be read or written by both a supervisor level request and by a user level request. The row 814 corresponds to the flag combination: SO=1; and SW=0. Because the flag SO is asserted (supervisor-only), the value of flag UW is ignored. A cache line having this particular combination of flags can be read by a supervisor level request, but cannot be read or written by a user level request. The row 815 corresponds to the flag combination: SO=1; and SW=1. A cache line having this particular combination of flags can be both read and written by a supervisor level request, but cannot be read or written by a user level request. While the present example includes three permission flags, SO, SW, and UW respectively, the permission information and the encoding of the permission information can vary from the illustrated values without departing from the scope of the present disclosure. For example, the global MPU 30 of data processing system 100 can maintain a fewer or a greater number of permission attributes and the global MPU can provide another set of permission information for storing in a cache of a processor core in response to a successful memory access to fill a cache line.

Figure 9:
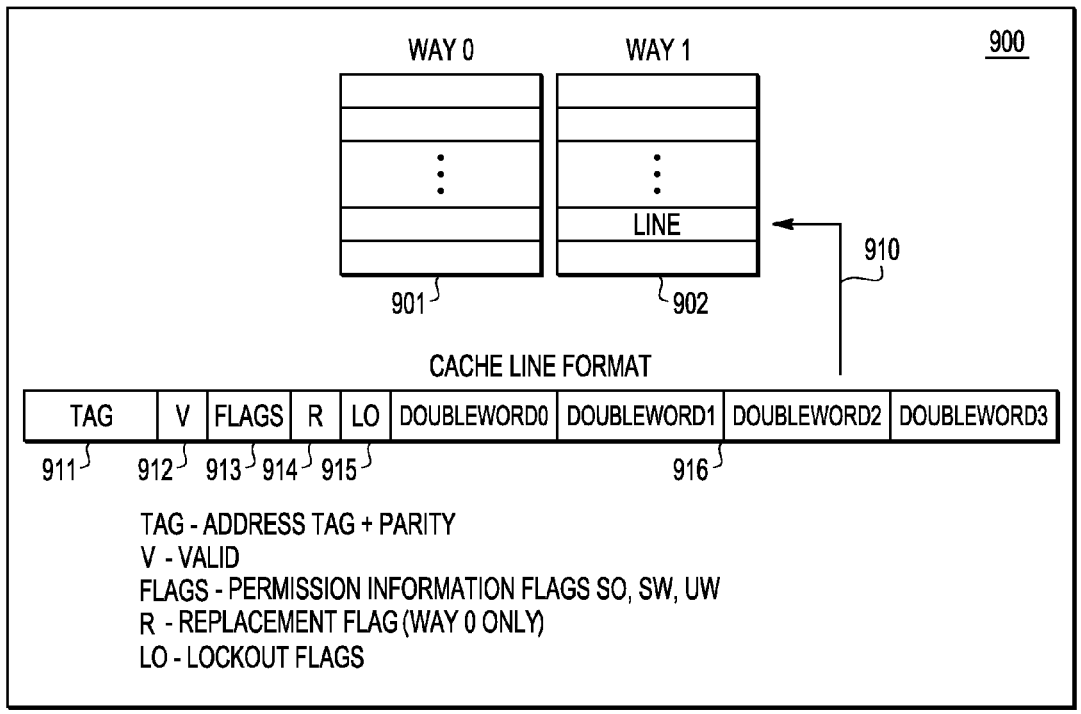
FIG. 9 is a block diagram illustrating a cache memory and an associated cache line in accordance with an embodiment of the present disclosure.

FIG. 9 is a block diagram illustrating a cache memory 900 and an associated cache line 910 in accordance with an embodiment of the present disclosure. For example, the cache memory 900 can be a specific embodiment of the instruction cache 52 or the data cache 51 included in data processing system 100 of FIG. 1. The cache memory 900 is a two-way set-associative cache memory that includes two memory arrays or array portions 901 and 902 labeled WAY 0 and WAY 1, respectively. One skilled in the art will appreciate that another type of cache memory organization can be used without departing from the scope of the present disclosure. For example, the techniques disclosed herein can be applied equally well to a single-way cache memory, an interleaved cache memory, a multiple-ported cache memory, and the like.

Each of cache arrays 901 and 902 include a plurality of cache lines, such as the cache line 910. Each cache line includes a plurality of fields including an address tag, TAG 911, a valid bit, V 912, permission information flags, FLAGS 913, a replacement flag, R 914, lockout flags, LO 915, and one or more information words 916. In this particular example, each cache line includes eight information words included contained in four doublewords, DOUBLEWORD0, DOUBLEWORD1, DOUBLEWORD2, and DOUBLEWORD3. The amount of information included in a cache line can vary without departing from the scope of the present disclosure. For example, a cache line can include a single byte of information, a single word of information, or any number of information words. During operation of cache memory 900, an address or a portion of an address can be stored in the tag field 911, which uniquely identifies the information 916. In the present example, the address stored in the tag field 911 represents the address corresponding to the block of stored doublewords.

The valid bit 912, if asserted, indicates that the corresponding cache line includes valid information. If the valid bit is negated, the corresponding cache line is invalid and does not supply data to satisfy an access request. The permission flags 913 includes permission information flags SO, SW, and UW if the cache is a data cache, and includes only a permission information flag SO if the cache is an instruction cache, as described above with reference to the table 800 of FIG. 8. In one embodiment, permissions granted by the permission information flags 913 apply equally to all cache information stored in a particular cache line. For example, the permission information flags 913 in cache line 910 determine access protection privileges associated with all four doublewords included in information 916. In an alternate embodiment, multiple sets of permission information flags 913 may be provided. A cache line can include fewer or a greater number of fields in addition to the permission flags 913. For example, a cache line in the cache memory 900 of the present example includes the replacement flag 914 and the lockout flags 915, the function of which is not relevant to the access permission protocol described herein.

Figure 10:
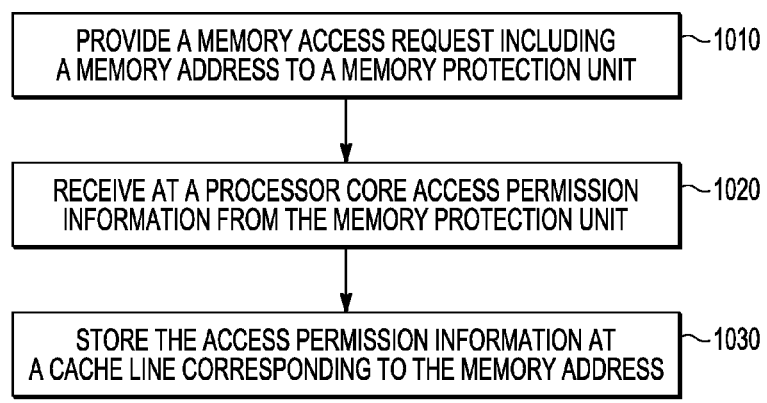
FIG. 10 is a flow diagram illustrating a method for storing permission information at a cache in accordance with a specific embodiment of the present disclosure.
Figure 11:
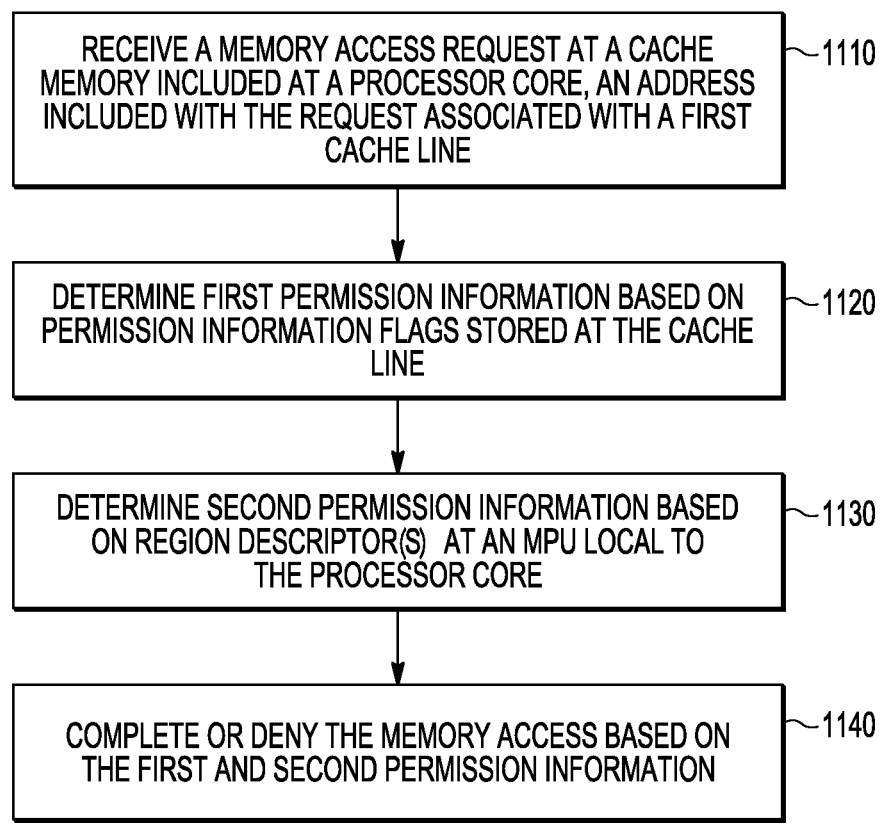
FIG. 11 is a flow diagram illustrating a method for retrieving permission information from a cache in accordance with a specific embodiment of the present disclosure.

The operation of a cache having cache line permission information can be better understood with reference to FIG. 10 and FIG. 11. FIG. 10 is a flow diagram illustrating a method 1000 for storing permission information in a cache in accordance with a specific embodiment of the present disclosure. In particular, in response to an access request issued by a processor core resulting in a successful memory access of a memory or memory-mapped device, and in response to storing the accessed information in a cache memory of the processor core, permission information maintained by a MPU is stored in a cache line of the cache memory along with the accessed information.

The method 1000 begins at block 1010 where a memory access request including a memory address is provided to a memory protection unit. For example, the processor core 10 of data processing system 100 of FIG. 1 can issue a request to access the memory device 40 or the slave device 42. The flow proceeds to block 1020 where a processor core receives access permission information from the memory protection unit. For example, upon completion of the memory access request by the processor core 10, the global MPU 30 can provide the requested information to the processor core 10. The global MPU 30 also can provide the processor core 10 with permission information associated with the address of the accessed location. For example, the global MPU 30 can provide the permission information flags SO, SW, and UW to the processor core 10 as described above with reference to FIGS. 8 and 9. The flow proceeds to block 1030 where the access permission information can be stored in a cache line corresponding to the address associated with the initial memory access request. For example, the processor core can store the accessed information along with the corresponding access permission information in a cache line of data cache 51 if the initial access was a data access, or in the instruction cache 52 if the initial access was an instruction access.

FIG. 11 is a flow diagram illustrating a method 1100 for retrieving permission information from a cache in accordance with a specific embodiment of the present disclosure. In response to a memory access request, such as an access request issued by the processor core 10 of data processing system 100 of FIG. 1, an inquiry to a local cache memory such as the data cache 51 or the instruction cache 52 can be provided to determine if the requested information is currently stored in a local cache memory and thus alleviating the need to access the desired information from an external memory, from a high level cache, or from another type of memory mapped device. A prior memory access request that resulted in storing the presently desired information in a local cache may have been allowed based on permission information, in part, maintained by a global MPU. In accordance with a specific embodiment, the permission information maintained by the global MPU governing the original memory access request can be stored in the cache line along with the corresponding information. Therefore, in response to a subsequent memory access request and a determination that the requested information resides in a local cache memory (a cache hit), the permission information previously stored in the associated cache line can be merged with applicable permission information provided by a local MPU, and the merged information can be used to determine whether the present access should be allowed or whether the request should be denied. In contrast to obtaining the entire permissions information from either the local MPU or from the cache (which would reflect the state of permissions maintained in the global MPU), the permissions information is merged, allowing the proper policy of either least-restrictive, or most-restrictive sets of attributes from a local and a global MPU to be applied.

The method 1100 begins at block 1110 where a memory access request is received by a cache memory included in a processor core, and where an address included with the request is associated with a cache line in the cache. For example, the processor core 10 of data processing system 100 of FIG. 1 can issue a memory access request, such as a request to store or retrieve data information at the specified address. The processor core 10 can determine if the desired data information is presently stored in the data cache 51 by comparing the address associated with the request with addresses included in the tag of each valid cache line of data cache 51. The flow proceeds to block 1120 where first permission information is determined based on permission information stored in the cache line. For example, upon determining that the desired information is included in a valid cache line of data cache 51, the values of permission information flags SO, SW, and UW can be retrieved from the cache line. The flow proceeds to block 1130 where second permission information stored in a MPU local to the processor core is determined. For example, the local MPU 60 provides permission information based on the memory address associated with the memory access request. The flow proceeds to block 1140 where the memory access is allowed or denied based on the first permission information and based on the second permission information. For example, the processor core 10 can identify permissions designated by both the permission information flags provided by the data cache 51 and the permission information maintained by the local MPU 60, and the access can be allowed or the request can be denied based on the more restrictive of the two sets of permission information. One skilled in the art will appreciate that the retrieval of permission information from the cache memory as described at block 1120 and the retrieval of permission information from the local MPU as described at block 1130 can occur in parallel, and an associated access request can be allowed or denied based on the two sets of permission information. In another embodiment, permission information can be retrieved sequentially, accessing permission information first from the local MPU, and then accessing permission information from the cache memory.

In an alternate embodiment, the less restrictive of the two sets of permission information may be used. In yet another embodiment, the selection of least-restrictive or most-restrictive policies may be based on one or more attributes of the access request, or on the type of instruction that caused the access request to be generated. For instance, certain cache management instructions may generate access addresses to be used in maintaining the state of one or more caches in data processing system 100. In one embodiment, the selection of least-restrictive or most-restrictive attribute policies may differ for one or more of these cache management instructions than for a normal load or store instruction access request. In another embodiment, the selection of least-restrictive or most-restrictive attribute policies may differ for accesses generated using a supervisor mode indication versus a user mode indication, such that for instance, a supervisor mode access uses the least-restrictive access policy, while the user mode access uses the most-restricted access policy. By combining access permissions information from a plurality of MPUs, data processing system 100 may obtain additional flexibility at reduced cost relative to prior systems.

Figure 12:
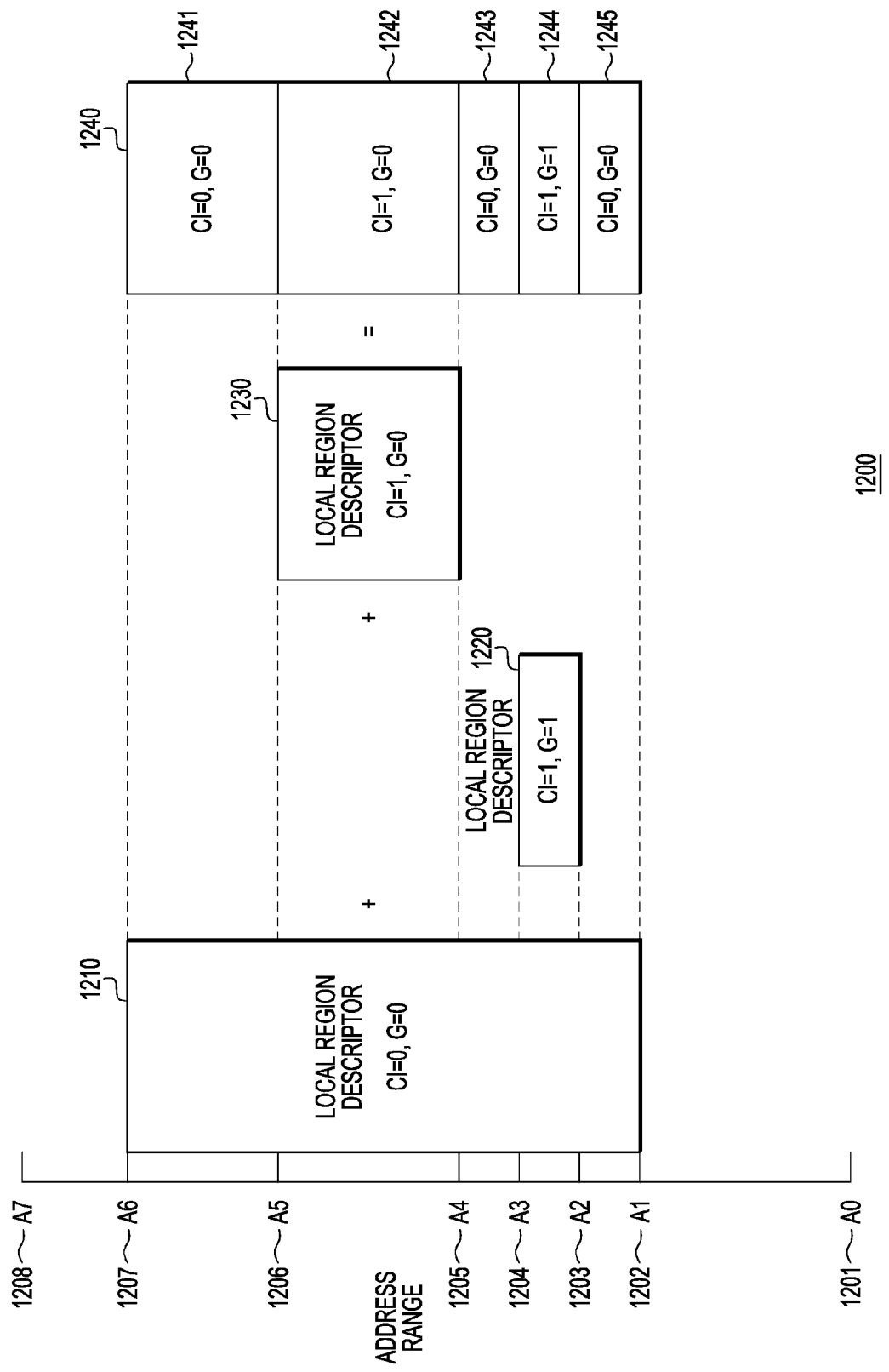
FIG. 12 is a graph illustrating a method for determining memory access permissions based on multiple valid MPU region descriptors in accordance with still another embodiment of the present disclosure.

FIG. 12 is a graph 1200 illustrating a method for determining memory access permissions based on multiple valid MPU region descriptors in accordance with another embodiment of the present disclosure. In particular, graph 1200 illustrates how cache-inhibit attributes and guarded attributes associated with one or more region descriptors determine whether an allowed access is identified as a cache-inhibited access, a guarded access, or both a cache-inhibited and guarded access. Graph 1200 includes a vertical axis representing a range of memory addresses. For example, the address range extending from address 1201 (A0) to address 1208 (A7) can represent the total addressable memory address space of data processing system 100 of FIG. 1. Graph 1200 includes a representation of a first local region descriptor 1210, a second local region descriptor 1220, and a global region descriptor 1230. For example, local region descriptors 1210 and 1220 can represent region descriptors included in local MPU 60 of FIG. 1, and global region descriptor 1230 can represent a region descriptor in global MPU 30 of FIG. 1. Graph 1200 also illustrates combined access permission information 1240 resulting from the combination of permission information provided by local region descriptors 1210 and 1220 and by global region descriptor 1230.

The local region descriptor 1210 provides accessibility indicators associated with a region of memory address space extending from an address 1202 (A1) to an address 1207

(A6). In addition, local region descriptor 1210 specifies that accesses performed to locations within this region are not identified as cache-inhibited or guarded accesses (CI=0 and G=0). The local region descriptor 1220 provides accessibility indicators associated with a region of memory address space extending from an address 1203 (A2) to an address 1204 (A3), which overlaps and is a subset of the region specified by the local region descriptor 1210. The local region descriptor 1220 specifies that accesses performed to locations within this region are identified as both cache-inhibited accesses and as guarded accesses (CI=1 and G=1). The global region descriptor 1230 provides accessibility indicators associated with a region of memory address space extending from an address 1205 (A4) to an address 1206 (A5), which overlaps and is a subset of the region specified by the local region descriptor 1210. The global region descriptor 1230 specifies that access performed to locations within this region are identified as cache-inhibited accesses, but not as guarded accesses (CI=1 and G=0).

The combined access information 1240 includes a region 1241 extending from the address 1206 (A5) to the address 1207 (A6), a region 1242 extending from the address 1205 (A4) to the address 1206 (A5), a region 1243 extending from the address 1204 (A3) to the address 1205 (A4), a region 1244 extending from the address 1203 (A2) to the address 1204 (A3), and a region 1245 extending from the address 1202 (A1) to the address 1202 (A2). Access permissions associated with the regions 1241, 1243, and 1245 are determined based on the accessibility indicators associated with the local region descriptor 1210 because no other region descriptor, local or global, defines alternate access permissions for these regions. Furthermore, accesses to locations within regions 1241, 1243, and 1245 are not identified as cache-inhibited accesses or as guarded accesses based on corresponding descriptor attributes specified by the local region descriptor 1210. Addresses corresponding to region 1242 are included within regions specified by both the local region descriptor 1210 and the global region descriptor 1230. The combined permissions associated with the region 1242 are determined on the basis of a most-restrictive policy. Furthermore, accesses to locations within region 1242 are identified as cache-inhibited accesses but not as guarded accesses because the cache-inhibit attribute is asserted in the global region descriptor 1230, based on the use of a most-restrictive policy.

Addresses corresponding to region 1244 are included within regions specified by both the local region descriptor 1210 and the local region descriptor 1220. The combined access permissions associated with the region 1244 are determined based on a least-restrictive policy because both region descriptors are local region descriptors. However, accesses to locations included within the region 1244 are identified as both cache-inhibited accesses and as guarded accesses because the guarded attribute in the local region descriptor 1220 is asserted. Accesses to locations included within the region 1244 are also identified as cache-inhibited accesses because the cache-inhibited attribute in the local region descriptor 1220 is asserted. If the guarded attribute at the local region descriptor 1220 was not asserted, a least-restrictive policy would have prevailed and accesses to locations included within the region 1244 would not be identified as cache-inhibited accesses. Guarded regions override the normal least-restrictive policy applied to multiple-matching descriptors from the same MPU for an access request. Note that in some embodiments, alternate region attributes may be implemented, and may utilize a most-restrictive policy for multiple matching descriptors in the same MPU, in contrast to the normal policy of least-restrictive. In addition, certain attributes may override other attributes, such as the guarded attribute override of the cache-inhibit attribute illustrated in the example of FIG. 12.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
receiving a first access request to write to a first memory, the first access request including a first address;
determining a first region descriptor at a local memory protection unit includes a first accessibility indicator specifying that writing to locations within a first region including the first address is not permitted;
determining a second region descriptor at the local memory protection unit includes a second accessibility indicator specifying that writing to locations within a second region including the first address is permitted;
determining a first access permission allowing the first access request based on the second accessibility indicator in response to determining the second accessibility indicator is less restrictive than the first accessibility indicator;
determining a third region descriptor at a global memory protection unit includes a third accessibility indicator specifying that writing to locations within a third region including the first address is not permitted; and
determining a second access permission denying the first access request based on the third accessibility indicator; and
denying the first access request at the local memory protection unit based on the second access permission in response to determining the second access permission denying the first access request is more restrictive than the first access permission allowing the request,
wherein the first region descriptor and the second region descriptor are provided at the local memory protection unit included at a first processor core, and the third region descriptor is provided at the global memory protection unit included in a processor system, the global memory protection unit outside the first processor core.

2. The method of claim 1, wherein the processor system includes a plurality of processor cores including the first processor core.

3. The method of claim 1, wherein determining the second access permission further comprises determining the second access permission based on a fourth accessibility indicator included at the global memory protection unit, the second access permission determined based on a least-restrictive of the third accessibility indicator and the fourth accessibility indicator.

4. The method of claim 1, wherein the first access permission is selected from a group consisting of a supervisor-read accessibility indicator, a supervisor-write accessibility indicator, a user-read accessibility indicator, and a user-write accessibility indicator.

5. The method of claim 1, wherein an accessibility indicator that allows an access of a specific access type is less restrictive than an accessibility indicator that does not allow the access of the specific access type.

6. The method of claim 1, wherein the first access permission is associated with a range of addresses, the range of addresses including the first address.

7. The method of claim 1, wherein the first accessibility indicator is associated with a first range of addresses and the second accessibility indicator is associated with a second range of addresses, and the first address being in the first range of addresses and in the second range of addresses.

8. The method of claim 7, wherein the third accessibility indicator is associated with a third range of addresses, the third range of addresses overlapping one or both of the first range of addresses and the second range of addresses, and the first address being in the third range of addresses.

9. The method of claim 1, further comprising:
providing an access exception indicator to a processor core associated with the first access request in response to denying the first access request.

10. A method comprising:
determining a first region descriptor at a first memory protection unit at a first processor core includes a first accessibility indicator specifying a request to write to a first address within a first region is not permitted;
determining a second region descriptor at the first memory protection unit includes a second accessibility indicator specifying the request to write to the first address within a second region is permitted;
determining a first access permission allowing the request based on the second accessibility indicator in response to determining the second accessibility indicator is less restrictive than the first accessibility indicator ;
determining a third region descriptor at a second memory protection unit external to the first processor core includes a third accessibility indicator specifying the request to write to the first address within a third region is not permitted;
determining a second access permission denying the request based on the third accessibility indicator; and
denying the request at the first memory protection unit based on the second access permission in response to determining the second access permission denying the request is more restrictive than the first access permission allowing the request.

11. The method of claim 10, wherein the second access permission information is further determined by both the third accessibility indicator and a fourth accessibility indicator, and further comprising:
determining whether to allow or deny an access request based upon the least-restrictive of the third accessibility indicator and the fourth accessibility indicator.

12. The method of claim 10, wherein an accessibility indicator that allows an access of a specific access type is less restrictive than an accessibility indicator that does not allow the access of the specific access type.

13. The method of claim 10, wherein the second memory protection unit is a system memory protection unit that is further coupled to a second processor core that includes a third memory protection unit.

14. A system comprising:
a memory device; and
a processor core including a local memory protection unit, the local memory protection unit to determine first permission information allowing a first access to the memory device in response to determining a first accessibility indicator at a first region descriptor at the local memory protection unit allowing the first access is less restrictive than a second accessibility indicator at a second region descriptor at the local memory protection unit denying the first access; and
a system memory protection unit coupled externally to the processor core, the system memory protection unit to determine second permission information denying the first access based on a third accessibility indicator denying the first access, the local memory protection unit to deny the first access in response to determining the second access permission denying the first access is more restrictive than the first access permission allowing the first access.

15. The system of claim 14, wherein an accessibility indicator that allows an access of a specific access type is less restrictive than an accessibility indicator that does not allow the access of the specific access type.

16. The system of claim 14, wherein the system memory protection unit is to provide the second permission information to the processor core.

17. The system of claim 16, wherein the local memory protection unit is to determine third permission information using the second permission information stored local to the processor core.

18. The system of claim 17, wherein the local memory protection unit is to determine the third permission information prior to determining whether to allow or deny the first memory access request.

* * * * *